United States Patent
Vanuytven

(10) Patent No.: US 6,374,681 B1
(45) Date of Patent: Apr. 23, 2002

(54) ELECTRONIC SCANNING DEVICE TO MEASURE AT HIGH SPEED, PHYSICAL PROPERTIES OF LARGE MULTI-DIMENSIONAL ARRAYS

(76) Inventor: Marcel Vanuytven, Pand 7, B-2440 Geel (BE)

( * ) Notice: Subject to any disclaimer, the term of this patent is extended or adjusted under 35 U.S.C. 154(b) by 0 days.

(21) Appl. No.: 09/416,274

(22) Filed: Oct. 14, 1999

(51) Int. Cl.[7] ............................. G01D 7/00; G01L 3/00
(52) U.S. Cl. ................................ 73/862.046
(58) Field of Search ...................... 73/862.041, 862.046, 73/862.627, 172, 862.474, 862.69; 361/283, 278; 338/5, 208

(56) References Cited

U.S. PATENT DOCUMENTS

| | | | | |
|---|---|---|---|---|
| 3,941,982 A | * | 3/1976 | Knollenberg et al. | ..... 235/92 D |
| 5,600,127 A | * | 2/1997 | Kimata | ................. 250/208.01 |
| 5,678,448 A | * | 10/1997 | Fullen et al. | ................. 73/172 |

* cited by examiner

Primary Examiner—Benjamin R. Fuller
Assistant Examiner—Octavia Davis
(74) Attorney, Agent, or Firm—Jack V. Musgrove

(57) ABSTRACT

A scanning system is described for a two-dimensional sensor array which uses one or more continuous layers of active sensing material. The sensing material can be selected for optimal measurement accuracy, avoiding the constraint of production requirements, for example the selection of manufacturing steps such as screen printing or individual mounting of sensors. Preferably, the sensitive areas can cover the area to be monitored in a substantially complete manner. Preferably, the scanning device for the sensor array produces an electronic rather then a physical isolation between the different sensors to be measured. Furthermore, in order to increase the scanning speed, multiple sensors may be scanned simultaneously until an active area is detected. Once detected the scan can concentrate on this area. In accordance with embodiments of the present invention, the scanning pattern of the sensor array may be changed dynamically to match the application.

20 Claims, 3 Drawing Sheets

ELECTRONIC SCANNING DEVICE TO MEASURE AT HIGH SPEED, PHYSICAL PROPERTIES OF LARGE MULTI-DIMENSIONAL ARRAYS

FIELD OF THE INVENTION

The present invention relates to sensor arrays of two dimensions or more for measuring a physical property which stimulates the sensor array at any position thereof, especially two-dimensional arrays for measuring pressure distributions.

TECHNICAL BACKGROUND

A conventional method of measuring a physical property, for instance a pressure pattern, on two dimensional surfaces is to arrange multiple sensors in a matrix. The matrix is scanned using multiplexer to connect the individual sensor elements with a driving clement (for example, a current or voltage source) and a receiving element (for example, a voltage or current amplifier). Often a processor is used to feed the driving element and select the sensor one by one and to read the result of the individual measurements. Such multiplexer systems are known from U.S. Pat. Nos. 4,856, 993, 5,756,904, 5,659,395, 5,505,072, 5,905,209 which are cited merely as examples.

These conventional systems all share a number of common limitations:

To optimize the required sensing hardware the matrix must be defined. Therefore different hardware and number of address lines have to be used for applications which require different sizes of the matrix.

For large surfaces the multiplexer control lines become long and accordingly reduce the scan speed.

For large surfaces the number of elements to be scanned becomes large and further reduces the scan speed.

The sensors, of which very large numbers are required, need to be constructed from a simple element suitable for mass production. This need for low manufacturing costs can result in the use of technologies for making the sensors with inherent quality control problems, for instance, the sensor include a sensitive layer made by screen printed pressure sensitive ink as described in International Patent Application WO 97/25379. The printing process can be very variable in quality. This often limits the sensing quality or accuracy, of the physical property to be measured.

The sensing element, often a resistor whose value changes due to the physical property of interest, needs to be isolated from its neighboring elements. If interconnections between sensors exist then crosstalk will appear causing ghost images and false measurements. This need to isolate increase the complexity of manufacture particularly with large size matrices. For instance, individual mounting of the sensors may be necessary which is costly.

Due to the required isolation between sensor elements the active surface, where the sensor measures the wanted physical property is usually only a fraction of the total surface from which results are to be recorded. Therefore a signal generated by a stimulation which lands in between sample points, can be measured only partially or is completely lost.

Preferably, each element contains some kind of switch so that each sensor can be switched on and off. This is conventionally done with a diode or transistor or by a mechanical switch action at the sensing point. If this switching is not present, the electronic output of an individual sensor which is not selected may not be zero and the leakage of thousands of such sensors together can still produce a considerable and often unstable signal. However, providing semiconductor active switching devices within the area of the matrix can increase the size of each sensor element and prevent manufacture of a flexible matrix or make its manufacture more difficult and/or costly. Further, electromagnetic screening of the select transistors may be necessary which increases the manufacturing complexity.

Often the processor needs to manipulate the output from the sensor matrix in order to obtain accurate and useful results, e.g. a sensitivity of a test signal has to be changed depending upon the range of values of the sensed property in order to compensate for the non-linearity of the sensing material. This results in a processor being an essential part of the complete device which increases the cost in some applications, e.g. simple surveillance where no analysis of the results is required.

Because of these limitations, it has been conventionally necessary to optimize tradeoffs to obtain a best fit to the requirements of a specific application.

An aim of the invention claimed is to provide a sensor array and a method of operating the same, in particular, for pressure measurement, which is an improvement over known sensor arrays.

It is a further aim of the present invention to provide a sensor array and a method of operating the same, which allows extension or change of shape of the array with minimum changes in the scanning electronics.

It is still a further aim of the present invention to provide a sensor array and a method of operating the same, which avoids the use of select switches at the sensing points.

SUMMARY OF THE INVENTION

The present invention may provide a multi-dimensional sensor array for sensing a physical property, comprising; a first plurality of generally parallel electrically conductive lines providing a first set of driven electrodes; a second plurality of generally parallel electrically conductive lines providing a second set of sensing electrodes, the sensing electrodes being at an angle to the driven electrodes; a sensitive sheet material in contact with the driven and sensing electrodes, the sensitive sheet having an electrical property which varies depending upon the physical property to be measured; a shift register unit comprising a linear array of one-bit registers and a data input to the first one-register of the shift register unit for inputting a serial bit stream, an output of each one-bit register being connected to one of the driven electrodes.

Current sensing circuits may be connected to the sensing electrodes, each current sensing circuit being connected to one of the sensing electrodes. The electrical property of the sheet material may be its sheet resistance. Alternatively, the electrical property may be is the transverse resistance or capacitance of the sheet material. The physical property to be measured may be a pressure applied to the sensor array. The object exerting the pressure on the sensor array may be a foot of a mammal. The sensing electrodes and the driven electrodes may both be in contact with one major surface of the sheet material. Alternatively, the sheet material may be sandwiched between the sensing and driven electrode sets. A clock circuit may be provided for supplying a clock signal to the shift register unit. An input circuit may be provided for applying a selectable serial pattern of bits to the data input of the first one-bit register of the shift register unit. The output from the current sensing circuits may be a video signal. The current sensing circuits may be current mirror circuits.

The present invention includes a sensor system for sensing a physical property comprising at least two sensor arrays joined at a common edge, each sensor array comprising; a first plurality of generally parallel electrically conductive lines providing a first set of driven electrodes; a second plurality of generally parallel electrically conductive lines providing a second set of sensing electrodes, the sensing electrodes being at an angle to the driven electrodes; a sensitive sheet material in contact with the driven and sensing electrodes, the sensitive sheet having an electrical property which varies depending upon the physical property to be measured; and a shift register unit comprising a linear array of one-bit registers and a data input to the first one-bit register of the shift register unit for inputting a serial bit stream, each stage being connected to one of the driven electrodes. The sensor arrays may be polygonal, e g. rectangular or square.

The present invention may provide a scanning system which uses one or more continuous layers of active sensing material. The sensing material can be selected for optimal measurement accuracy, avoiding the constraint of production requirements, for example the selection of manufacturing steps such as screen printing or individual mounting of sensors. Preferably, the sensitive areas can cover the area to be monitored in a substantially complete manner. Preferably, the scanning device for the sensor array produces an electronic rather then a physical isolation between the different sensors to be measured. Furthermore, in order to increase the scanning speed, multiple sensors may be scanned simultaneously until an active area is detected. Once detected the scan can concentrate on this area. In accordance with embodiment of the present invention, the scanning pattern of the sensor array may be changed dynamically to match the application.

The invention uses two different schemes to create an electronic, rather then a physical, isolation. For example, for a two dimensional surface to be measured, the surface is segregated by lines of electrodes in one dimension, for instance the y axis, which are maintained at ground level by the use of a current mirror. In the other direction, the x axis, the isolation is created by driving each intersecting line of electrodes which is to be excluded from the measurement (i.e. those lines which are not selected for measurement), to a zero voltage level.

In accordance with embodiments of the present invention, the sensor elements find themselves surrounded in all directions by a zero voltage field. Thus, whether these sensors are isolated or continuously connected or have a high or low impedance is irrelevant, no current will flow between points of equal voltage. The sensors which is neighbor lines driven by a sink (zero voltage) level will not contribute to any measurements and produce no leakage or capacitance effects.

DESCRIPTION OF THE ILLUSTRATIVE EMBODIMENTS

The present invention will be described with reference to certain embodiments and drawings but the present invention is not limited thereto but only by the claims. The drawings are schematic.

Figure 1:
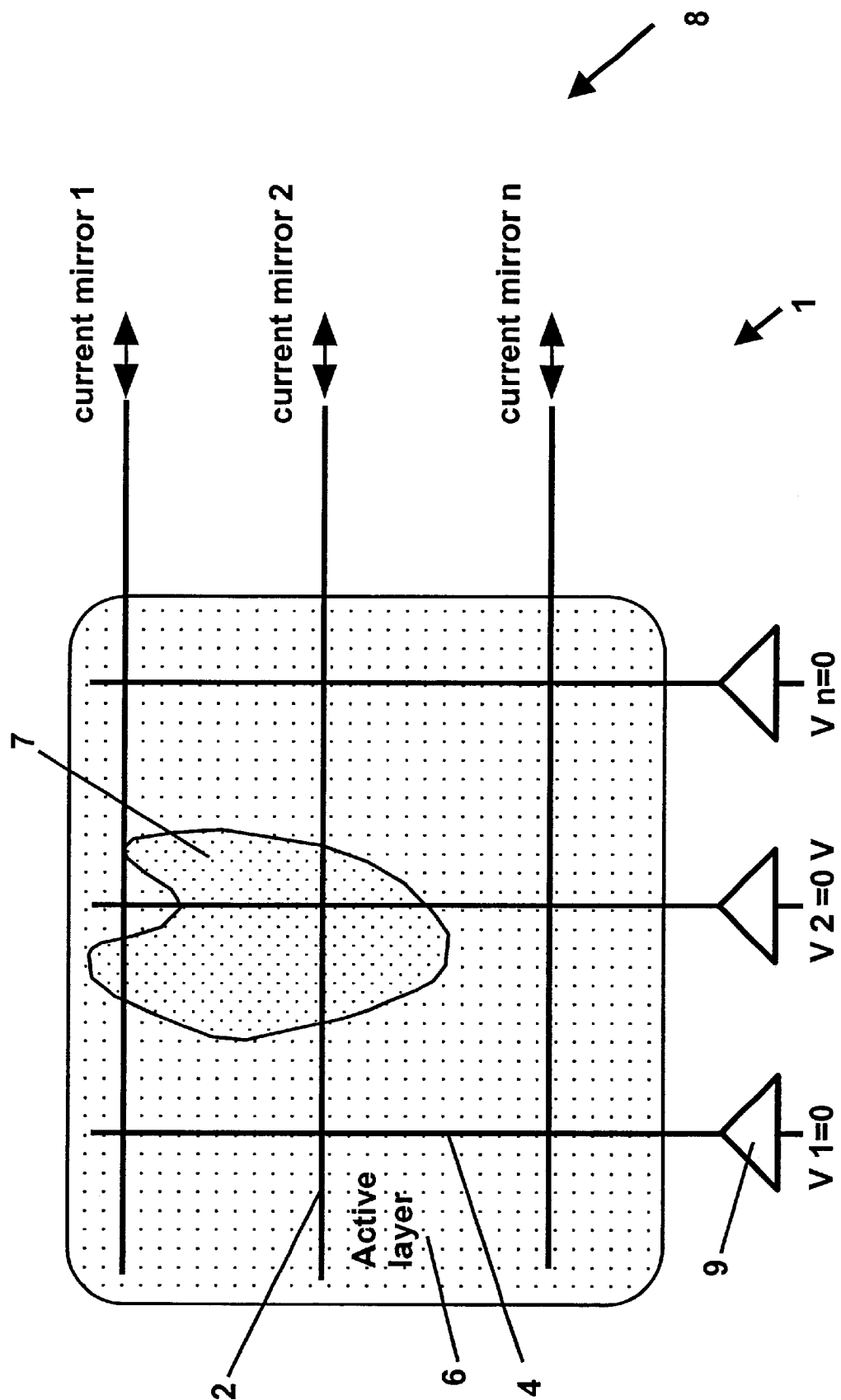
FIG. 1 is a schematic top-view of an electrode and scanning arrangement for use with a sensitive sheet.

FIG. 1 is a schematic representation of a sensor array 1 in accordance with the present invention. The sensor array 1 comprises a sensitive sheet 6 and a grid or matrix of intersecting lines 2, 4. The sensor array may be polygonal, e.g. rectangular or square but the present invention is not limited thereto. The intersecting lines 2, 4 are in contact with at least major surface of the sheet 6. The lines 2, 4 intersect each other at an angle, e.g. at 90° but the present invention is not limited to this single angle. Preferably, the sheet 6 and the lines 2, 4 are flexible. The sheet 6 has a physical property, e.g. electrical resistance or capacitance, which varies in accordance with the physical property to be measured, e.g. temperature or pressure. Some aspects of materials which change electrical resistance with pressure are discussed in U.S. Pat. No. 5,408,873 which is incorporated herein by reference. Sheet 6 may include one or more layers of sensitive material or may include combinations of materials such as a polymer sheet coated with a conductive ink. Sheet 6 is preferably a continuous sheet of material but the present invention also includes textile materials for sheet 6 which may be woven or knitted Each line 2 of one set of lines is connected to a current sensing circuit, e.g. a current mirror sensing circuit 8. Each line 4 of the other set of lines is switchably connected to a source of voltage 9. In FIG. 1 the lines 2 and 4 represent low electrical resistance, e.g. metal or conductive polymer or carbon, barriers at ground potential, created by the use of a number of electrodes in contact with the active sensing sheet 6. The sets of lines 2 and 4 may be on alternate sides of sheet 6 so that sheet 6 is sandwiched between a set of lines 2 and a set of lines 4. However, it is preferred in some applications if lines 2 and 4 are in contact with sheet 6 on the same side of sheet 6, i.e. with a major surface of sheet 6. Except for the contact through the sheet 6, the lines 2, 4 are insulated from each other, i.e. at their intersections the lines 2 and 4 are insulated from each other if they are on the same side of sheet 6. When one or more lines 4 are driven by a source voltage (for instance +5 volts) then the active sensing areas in the sheet 6 of continuous material, in the neighborhood of the one or more driven lines 4, are in a position to interact with the sensing lines 2 which intersect with the one or more driven lines 4. Sensing lines 2 are preferably maintained at or close to virtual ground potential, e.g. each line 2 is terminated by a current mirror 8. In accordance with the present invention the areas of sheet 6 which contribute to current flowing in lines 2 include areas between lines 2 and 4. If an area 7 of the sensitive sheet 6 is stimulated the resulting currents from all selected surfaces of sheet 6 and travel along the respective sensing line 2 and are added in the respective terminating current mirror 8. These sensed currents can be easily converted into a voltage to be sampled by a processing device or a display device. Note that the collected current from each sensitive area which surrounds the intersection of lines 2, 4, travels along a different line 2 and appears at a different output current mirror 8.

Figure 2:
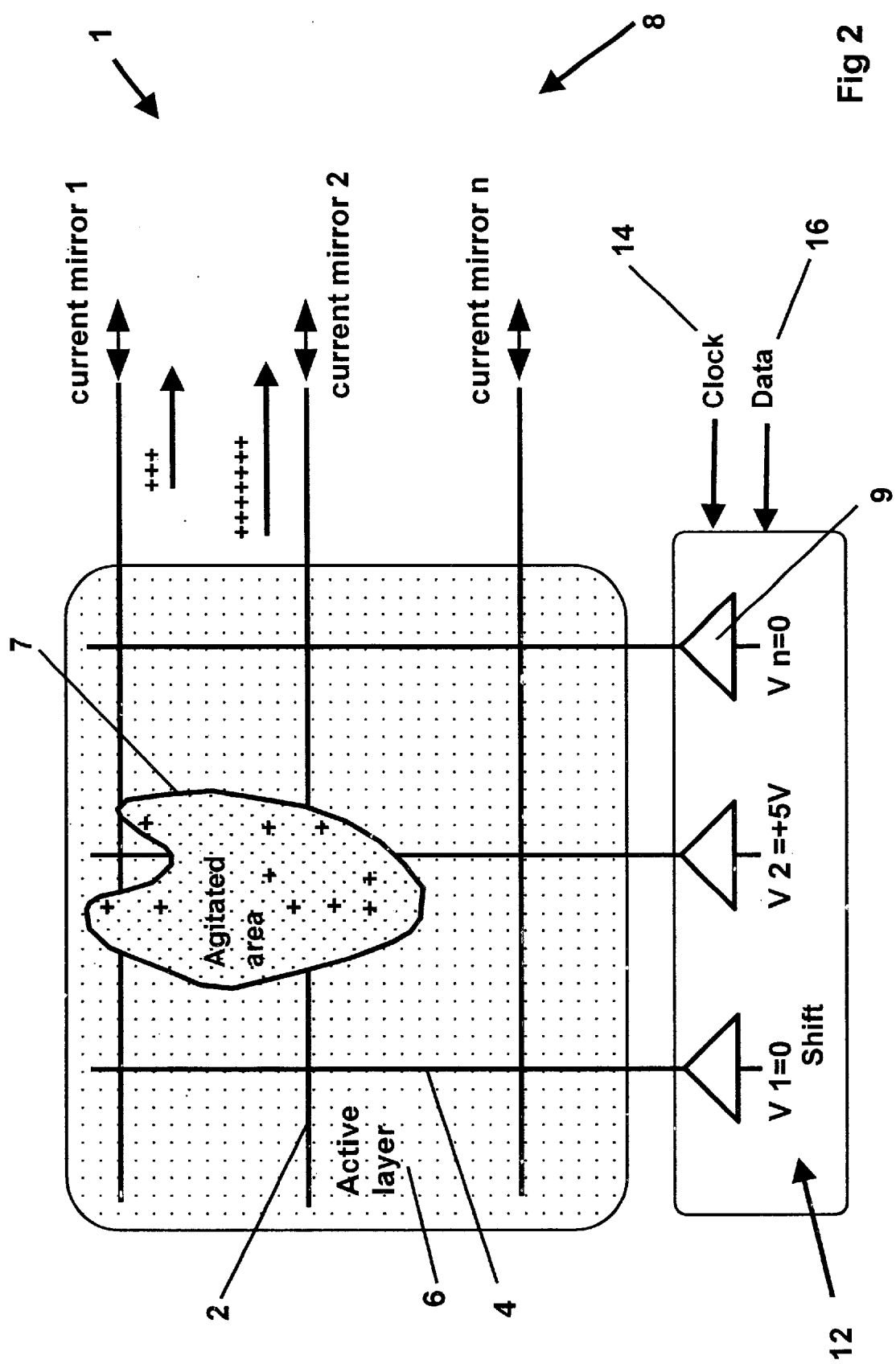
FIG. 2 is a schematic top-view of an electrode and scanning arrangement in accordance with an embodiment of the present invention for use with a sensitive sheet.

FIG. 2 shows an embodiment of the present invention in which a shift register 12, rather then a conventional multiplexer, is used to apply a pattern of voltage to the driven lines 4. A shift register is a device which has a plurality of one-bit registers arranged in a line. The first on-bit register in the line has a serial input for a digital signals and an input for a clock signal. There is usually also a reset contact on the first one-bit register with which the complete shift register 12 can be reset. The binary serial input consists of a stream of logical "1" or "0" values. Each value entered into the shift register 12 is indexed down by one one-bit register when the next digital signal in the serial data stream is input to the shift register 12. Each one-bit register of a shift register 12 has an output which reflects the value currently stored in that one-bit register. There are many ways of constructing a shift register or a device which has the same function as a shift register known to the skilled person. One of the simplest is with a linear series of flip-flop circuits but the present invention is not limited thereto. An advantage of a shift register or similar electronic device is that there is only one input but effectively an unlimited number of drive outputs all of which change at the same time as the value of the bit stored in the previous on-bit register of the shift register 12 is indexed into the next one-bit register. A suitable shift register is, for example, type 74 ACT 299 supplied by National Semiconductor, U.S.A.

The advantage of this arrangement is significant when large areas need to be scanned. Through the use of a clock signal 14 to clock in data, a serial bit stream 16 can be clocked into the shift register 12 and the application of a sensing voltage is shifted from one drive line 4 to the next as the relevant binary value is input to the shift register 12. Thus a sensing voltage runs across the surface of the sensor array 1 like a wave as the relevant logical value travels down the shift register. The speed of the "wave" is determined by the clock speed. The number of drive lines 4 which are driven simultaneously depends upon the pattern of bits in the data bit stream 16. By controlling and changing the bit pattern 16, a processor (not shown) for controlling the operation of the array 1 can digitally control the area of the sensor array 1 that is scanned. The circuit which inputs the data patterns need not include a processor. It may include a customized circuit which generates several different useful patterns and the operator of the device may select one of these patterns at any time.

For instance, for a very long sensor array 1 when waiting for a stimulus to occur, the bit pattern 16 supplied to the shift register 12 may consist only of a single binary value, e.g. all value "one", thus providing instantaneous detection on the sense lines 2 if any location 7 of the sensor array 1 is stimulated. Subsequently, when more information is required on the position and shape of the stimulated area 7, the bit pattern 16 supplied to the shift register 12 is adapted accordingly, e.g. the number of activated drive lines 4 may be severely reduced in order to search more closely for the stimulus. Hence, in accordance with one aspect of the present invention the number of driven lines 4 which are driven at any moment may be adapted dynamically to provide the most appropriate scan of the array 1 for the specific application.

The method described above can be applied to read out a sensor array 1 for measurement of images of different physical properties, e.g. temperature, radiation, magnetic field, force, pressure etc. It allows use of a sheet material 6, whose electrical resistance changes due to a physical stimulus. This provides a significant advantage as the sensor elements of the array 1 are provided by a continuous sheet 6 rather then requiring a large number of individually mounted or constructed sensor elements. The reduction in production cost is considerable, for instance the use of individual fixtures and glue for the sensors can be avoided. Furthermore, the accuracy is improved. If individual small pieces of active sensing material are applied in an matrix manufacturing deviations can be much higher than with a continuous sheet 6 of material. Further, the resolution of the image is only limited to the spacing of the lines 2, 4. For production of highly conductive electrodes in very accurate locations suitable methods are readily available, for instance methods of applying metallic or carbon coated conductive lines on printed circuit boards.

Figure 3:
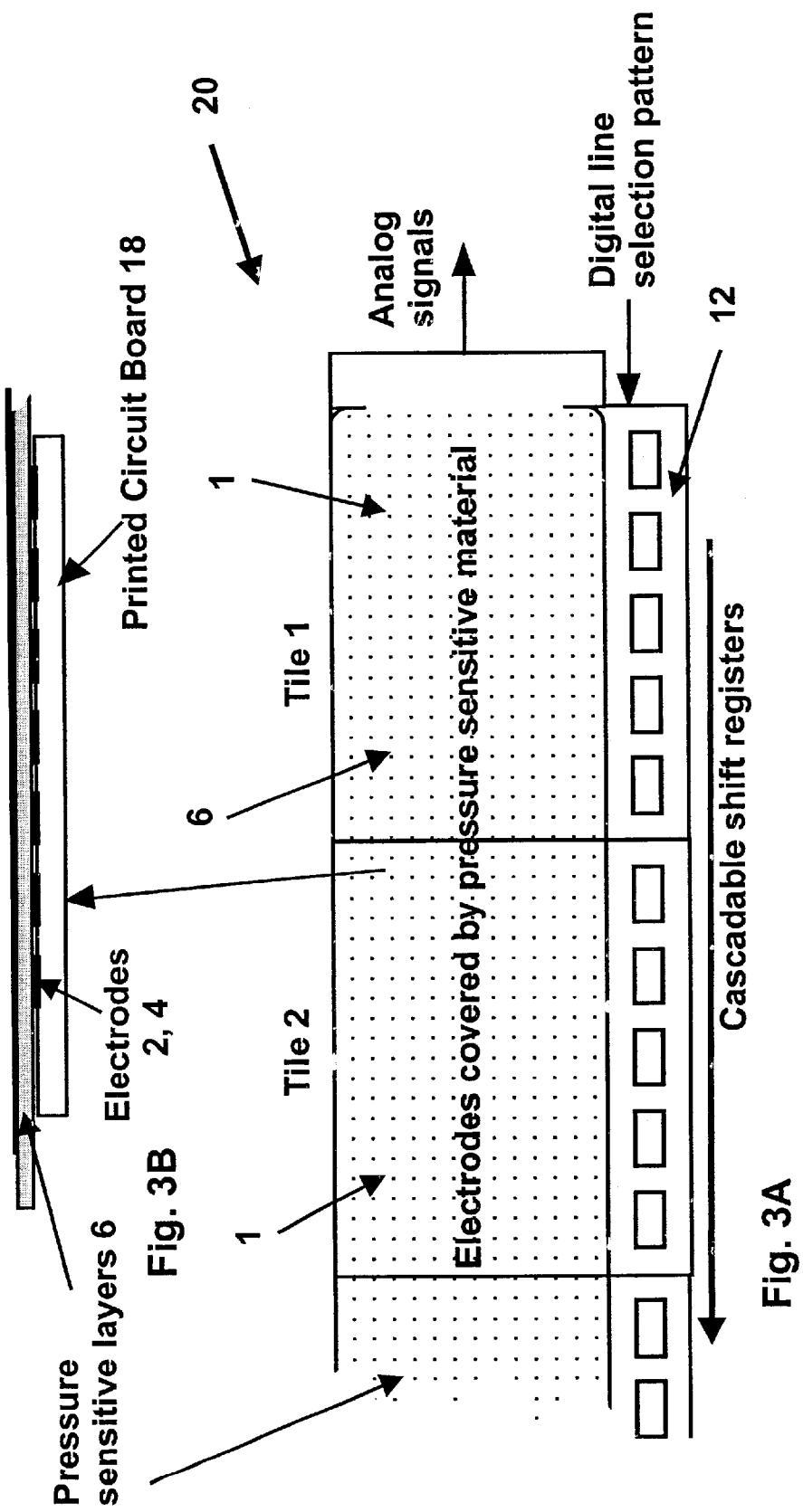
FIGS. 3A and B are a schematic top view and cross-sectional view of an embodiment of the present invention.

Conventionally, intersecting conductive lines for sensor arrays have usually been arranged on opposite sides of the active sensor material to hold the active piece of sensing material in the required position. In accordance with the present invention a continuous sheet material is used and therefore the accuracy of measurement is not reduced by small lateral shifts of the active sensing material. This is very important if the sensor array 1 is to measure force or pressure. For discrete sensor elements, mechanical deformation, bending and impact limits the lifetime considerably. On the other hand with continuous sheets of sensing material combined with the scanning method in accordance with the present invention, the conductive lines 2, 4 can be arranged on one side of the sensitive sheet 6 as shown schematically in FIGS. 3A and B. FIG. 3A is a schematic top-view of a sensitive sheet 6, with shift register 12 along one side for driving the driven lines 4 and a connector (not shown) along the other edge for contacting the sensing lines 2 and for extracting the analog output signals. As shown in FIG. 3B the sensitive sheet 6 may be laid onto a printed circuit board 18 which has the lines 2, 4 applied thereto by conventional printed circuit board methods. Hence, one aspect of the present invention is that the conductive lines 2, 4 do not have to be applied to sheet 6 but only need to be brought into contact with sheet 6 from another body, e.g. a printed circuit board 18. When a force is applied to the upper side of sheet 6, the resistance of the sheet changes local to the pressure applied and therefore the resistance between lines 2 and 4 also changes in the area of the applied pressure.

FIG. 3A illustrates another aspect of the present invention. The sensor array 20 shown in FIG. 3A is made up of a linear series of sensor arrays 1 or tiles each of which is similar to an array 1 described above. The shift registers 12 along one side are joined in series along a common edge to form a continuous shift register 12 so that a bit entered at the right hand end travels towards the left as other bits are entered. The sensing lines 2 are joined together by suitable connectors (not shown) in parallel, two sensor arrays 1 or "tiles" being connected along a common edge. Where the printed circuit boards 20 are used, standard PCB connectors may be used.

With such an arrangement accuracy can be maintained for a longer time even when the sheet 6 is flexed because a flexible sheet 6 comprising one or more sensitive layers is used rather than discrete sensors. Furthermore, the use of shift registers 12 to extend the pattern in one direction dramatically simplifies the extension of the sensor array 20 in one direction. Tiles of identical sensor arrays 1 can be cascaded to cover meters in length using standard printed circuit boards without reducing scan speed nor increasing the complexity of the scanning circuits.

The following is an example to show the use of the present invention to measure pressure images in a dynamic way. Such an apparatus is for instance useful to record the pressure images created at the surface of a foot during an exercise. Typically, up to 500 images per second are needed to preserve the details. Since the person is running during the test the sensor array 1 can be more then a meter in length in order to catch at least one impression. The required resolution is about 5 mm, a complete sensor array 1 can typical contain 20,000 measurement points (intersections of lines 2, 4). If 500 pictures per second must be sampled only 0.1 μsec is available for each measurement. This is to short a time to multiplex the data considering the long connection lines. Hence, it has been convention to use of parallel array arrangements to achieve the required throughput although with the disadvantage of creating a high cost.

In accordance with the present invention, a scanning pattern 16 of only a fraction of the sensor array length may be used. For instance, a sequence 16 of a high bit followed by 65 low bits is clocked into the shift register 12. The total length of the sensor array 1 in this case 200 pixels, therefore three driven lines 4 are activated simultaneously at any one time. The sample clock for the output of the current mirrors an run three times lower and the data is settled to a higher accuracy. To provide unambiguous results the voltage source patterns scanning the sensor array 1 are preferably separated from each other by a distance grater then the object (foot) to be measured. In fact the sensor array 1 can be several meters and still use the same image rate. If the same sensor array 1 is used to measure the static pressure of both feet then the processor controlling the bit sequence 16 changes this sequence to one active bit per meter distance. This provides the correct image at a lower rate.

The connection of the complete sensor array with a processor (PC) is simple to extend and is similar to the connection to a video camera. Compared with a multiplexed type of arrangement less hardware is required in the sensor array and in the scanning electronics thus reducing size and cost. In accordance with the present invention a processor is not necessary for certain applications. As the output from the current mirrors 8 is similar to a video signal because it is clocked by the clock signal 14, it is possible to display the output directly using video display equipment. All that is necessary is to provide a suitable clock signal 14, e.g. from a suitable electronic clock circuit as well as a data pattern 16 which may be provided by another suitable circuit which does not need to be programmable. The analogue signal from the current mirrors 8 can be fed to a suitable display unit which may include an analogue-to-digital converter if the display device is digitally operated as well as suitable frame processing circuits. The analogue output of the current mirrors 8 may be recorded on magnetic tape for later display and analysis. Alternatively, the output from the current mirrors 8 may be supplied to an analogue-to-digital converter and the digital results stored on a digital memory device such as a diskette, a replaceable hard-drive, a hard drive, a tape, etc. The stored data can then be retrieved later for viewing and/or more complex analysis.

The present invention may provide the following advantages.

The sheets of active sensing materials may be selected to provide a more linear response of current versus pressure than has been available with conventional discrete isolated sensor elements. In accordance with the present invention a useful sample can be obtained in one clock cycle, no complicated mechanisms for changing measurement sensitivity are needed. This is assisted by the fact that the active material can be used using its volumetric response, rather then only a change of surface behavior.

For different applications, e.g. scanning foot pressures, tire imprints, walking patterns of small animals, a different active sensing material (layer, sheet) may be optimally selected. The hardware interface can be re-used, only the software parameters for programming the processor are adapted to fit the requirements. The present invention includes a combination of different layers of conductive materials to form a sensitive sheet 6 to obtain the optimum characteristics for a specific application.

When damage or wear occurs of the active sensing sheet 6, the complete sheet can be replaced since the material does not need to be inserted between the lines 2, 4 but merely applied thereto. The mechanical strength of sheet 6 can be much higher then when separate elements are used.

There is improved isolation between sensing points, there is no crosstalk and no ghost images appear.

Software algorithms for improving accuracy can focus on correcting for complex physical mechanisms like hysteresis rather then having to compensate for the dynamic range of the sensor output voltages or currents as with conventional discrete contact sensors. This is possible because the continuous sensing sheet 6 can be more stable then small individual discrete sensing elements.

Different layers and doping elements may be used to fabricate the sheet 6. No variable quality processing techniques such as screen printing need to be applied to the active sheet 6 although they are not excluded from the present invention.

Mechanical stress, shifting the active sheet 6 has little influence on the accuracy of the measurements.

Conductive lines 2, 4 are only used for contacting, the shape of the lines 2, 4 may be adapted to the physical properties and objects to be measured. The accuracy depends less on the nature of the lines 2, 4, more on the material of the sheet 6.

Very high scanning speeds can be obtained since all non-selected sensing points are maintained at zero voltage and the effect of parasitic capacitance is very low. Scanning speed can be improved by a decade compared with multiplexed sensors.

The size of the array 1 in one dimension can easily be extended, for example a sensor array 1 can be cascaded with identical sensor arrays 1 in one direction thus lowering the cost of development and production. Many applications using large sensor surfaces require linear rather then quadratic extension. The shifting bit sequence drive of a shift register in accordance with the present invention lowers the cost of scanning compared with multiplexing.

Susceptibility to electromagnetic radiation (EMC) is strongly reduced since all elements are maintained at a low impedance state and fixed voltages. This is very important since the scanning area can act as a large antenna.

While the invention has been shown and described with reference to preferred embodiments, it will be understood by those skilled in the art that various changes or modifications in form and detail may be made without departing from the scope and spirit of this invention as defined in the attached claims. For instance, a two-dimensional sensor array has been described but the present invention is not limited thereto and may include more dimensions or may include more than one set of sensing lines or more than one set of driven lines. The invention has mainly been described with reference to active sheet material 6 whose resistance varies with pressure but other sensitive sheet may be used in accordance with the present invention, e.g. sheets whose capacitance varies with pressure, sheets whose resistance varies with temperatures where a temperature distribution is to be measured. The sensor array described have been based on intersecting conducting lines 2, 4 which intersect at 90° but other angles may be used.

What is claimed is:

1. A multi-dimensional array of sensors for sensing a physical property, comprising:
   a first plurality of generally parallel electrically conductive lines providing a first set of driven electrodes, each parallel electrically conductive line of the first plurality connecting a plurality of sensors along one direction;
   a second plurality of generally parallel electrically conductive lines providing a second set of sensing electrodes, the sensing electrodes being at an angle to the driven electrodes, each parallel conductive line of the second plurality connecting a plurality of sensors along a second direction;
   a sensitive sheet material in contact with the driven and sensing electrodes, the sensitive sheet having an electrical property which varies depending upon the physical property to be measured;
   a shift register unit for driving the first plurality of electrically conductive lines, the shift register comprising a linear array of one-bit registers and a data input to a first one-bit register of the shift register unit for inputting a serial bit stream, an output of each one-bit register being connected to an input of the next bit register in the linear array except for the last bit register and a further output of each bit register being connected to one of the driven electrodes, for driving that electrode.

2. The multi-dimensional sensor array according to claim 1, further comprising current sensing circuits, each current sensing circuit being connected to one of the sensing electrodes.

3. The multi-dimensional sensor array according to claim 1, wherein the electrical property is a sheet resistance of the sheet material.

4. The multi-dimensional sensor array according to claim 1, wherein the electrical property is a transverse resistance of the sheet material.

5. The multi-dimensional sensor array according to claim 1, wherein the physical property is pressure applied to the sensor array.

6. The multi-dimensional sensor array according to claim 5, wherein an object exerting the pressure on the sensor array is a foot of a mammal.

7. The multi-dimensional sensor array according to claim 1 wherein the sensing electrodes and the driven electrodes are both in contact with one major surface of the sheet material.

8. The multi-dimensional sensor array according to claim 1, further comprising a clock circuit for supplying a clock signal to the shift register unit.

9. The multi-dimensional sensor array according to claim 1, further comprising an input circuit for applying a selectable serial pattern of bits to the data input of the shift register unit.

10. The multi-dimensional sensor array according to claim 2, wherein an output from the current sensing circuits is a video signal.

11. The multi-dimensional sensor array according to claim 2, wherein the current sensing circuits are current mirror circuits.

12. A sensor system for sensing a physical property comprising at least two sensor arrays joined at a common edge, each sensor array comprising:
    a multidimensional array of sensors,
    a first plurality of generally parallel electrically conductive lines providing a first set of driven electrodes, each parallel electrically conductive line of the first plurality connecting a plurality of sensors along one direction;
    a second plurality of generally parallel electrically conductive lines providing a second set of sensing electrodes, the sensing electrodes being at an angle to the driven electrodes, each parallel conductive line of the second plurality connecting a plurality of sensors along a second direction;
    a sensitive sheet material in contact with the driven and sensing electrodes, the sensitive sheet having an electrical property which varies depending upon the physical property to be measured;
    a shift register unit for driving the first plurality of electrically conductive lines, the shift register comprising a linear array of one-bit registers and a data input to a first one-bit register of the shift register unit for inputting a serial bit stream, an output of each one-bit register being connected to an input of the next bit register in the linear array except for the last bit register and a further output of each bit register being connected to one of the driven electrodes for driving that electrode, and the shift registers of the at least two sensor arrays are joined at the common edge.

13. The sensor system according to claim 12, wherein each sensor array comprises current sensing circuits, each current sensing circuit being connected to one of the sensing electrodes.

14. The sensor system according to claim 12, wherein the electrical property is a sheet resistance of the sheet material.

15. The sensor system according to claim 12, wherein the electrical property is a transverse resistance of the sheet material.

16. The sensor system according to claim 12, wherein the physical property is pressure applied to the sensor array.

17. The sensor system according to claim 12 wherein the sensing electrodes and the driven electrodes are both in contact with one major surface of the sheet material.

18. The sensor system according to claim 12, further comprising an input circuit for applying a selectable serial pattern of bits to the data input of the shift register unit.

19. The sensor system according to claim 13, wherein the current sensing circuits are current mirror circuits.

20. The sensor system according to claim 16, wherein the pressure applied is provided by a foot of a mammal.

\* \* \* \* \*